United States Patent [19]

Godfrey

[11] 3,941,299

[45] Mar. 2, 1976

[54] METHOD OF BRAZING CU ALLOYS TO AG-CDO ALLOYS

[75] Inventor: Loren Godfrey, Morristown, N.J.

[73] Assignee: Engelhard Minerals & Chemicals Corporation, Murray Hill, N.J.

[22] Filed: Aug. 26, 1974

[21] Appl. No.: 500,586

[52] U.S. Cl. .................. 228/219; 29/199; 228/245; 228/263
[51] Int. Cl.² ........................................ B23K 1/04
[58] Field of Search ............. 29/494, 504, 500, 199; 228/219, 263, 245

[56] References Cited
UNITED STATES PATENTS

| | | | |
|---|---|---|---|
| 3,802,062 | 4/1974 | Harmsen et al. | 29/504 X |
| 3,821,848 | 7/1974 | Backstrom | 29/504 X |
| 3,845,543 | 11/1974 | Roth et al. | 29/494 X |

OTHER PUBLICATIONS

Metals Handbook Vol. 6, Welding and Brazing, 8/1971, pp. 685–702.
Semi–Alloys Inc. publication, Part I, Brazing and Soldering Alloys, 1962.

Primary Examiner—L. Dewayne Rutledge
Assistant Examiner—Arthur J. Steiner

[57] ABSTRACT

Copper alloy carrier objects are brazed to silver or copper alloy contact objects by assembling or positioning the carrier object into direct contact with said contact object such that there is defined or presented an exposed position or junction where said carrier object and said contact object come into direct contact, then placing at said position or junction a quantity, such as a pellet or piece, of a brazing alloy and subjecting the resulting assembly to furnace brazing at an elevated temperature for a sufficient period of time in a non-reactive gaseous atmosphere to cause said brazing alloy to melt and to join and braze together said carrier object and said contact object.

15 Claims, 3 Drawing Figures

METHOD OF BRAZING CU ALLOYS TO AG-CDO ALLOYS

This invention relates to a method of brazing. More particularly, this invention is directed to a method of brazing or bonding copper and copper alloy objects to silver, silver alloys and silver cadmium oxide alloys.

In accordance with one embodiment, this invention is directed to an improved method of furnace brazing. In accordance with another embodiment, this invention is directed to the production of brazed metal objects and to the resulting produced brazed metal objects.

It is conventional practice in the brazing of metal objects, such as the brazing of a silver cadmium oxide alloy contact member to a copper alloy backing or carrier member, to place the members to be brazed in the position desired in the finished brazed metal object together with brazing alloy shims or paste, with or without flux, and then to heat the resulting assembly, such as by induction, torches or in a furnace so as to melt the brazing alloy and to effect joining or brazing together of the resulting assembly. Such conventional practice, however, has not always yielded satisfactory brazed joints or a satisfactory brazing of the objects. Such conventional practice also possesses limitations with respect to the brazing of objects where the braze joint to be accomplished is at a difficult-to-reach location because of the complexity of the parts or members to be joined. Also, such conventional practice, as indicated hereinabove, has not always produced a strong, clean brazed joint of desired size and strength.

Accordingly, it is the object of this invention to provide an improved method for brazing metal objects.

It is another object of this invention to provide an improved method for the brazing of copper alloy objects and silver alloy, copper alloy and silver cadmium oxide alloy objects.

Still another object of this invention is to provide brazed products having improved brazed joints or connections.

How these and other objects of this invention are accomplished will become apparent in the light of the accompanying disclosure made with reference to the accompanying drawing wherein FIG. 1 illustrates schematically, in an exploded view, an assembly of metal objects to be brazed in accordance with the practices of this invention.

Figure 1:
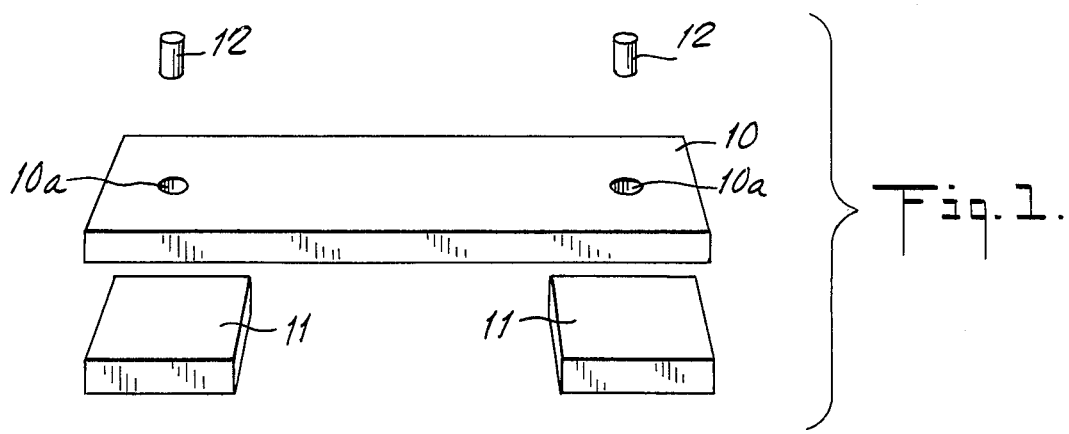

In accordance with one embodiment of the practices of this invention, at least one of the foregoing objects will be achieved.

In accordance with the practices of this invention, it has been discovered that an improved brazing operation and resulting brazed objects is achieved by carrying out the brazing in a furnace brazing operation wherein the brazing alloy employed to braze or join together the objects to be brazed is positioned relative to the objects to be brazed such that the brazing alloy, in particle or pellet or wire form, is positioned at or along an exposed position or junction where the objects to be joined come into direct contact, followed by furnace brazing the resulting assembly in a nonreactive gaseous atmosphere to cause the brazing alloy to melt and to join and braze and bond together the objects.

This invention will now be described in accordance with one embodiment of the practices of this invention specifically directed to the brazing of a copper alloy object to a silver cadmium oxide alloy contact object. More specifically, a copper alloy carrier object is brazed to an alloy contact object, the alloy contact object being made up of a silver cadmium oxide alloy having a cadmium oxide content in the range from about 5 to about 15% by weight and a fine silver backing. Other alloys, if desired, may be employed to make up the contact object, such as silver tungsten alloy, silver tungsten carbide alloy, silver nickel alloy, silver iron alloy, silver carbon alloy, silver molybdenum alloy, copper tungsten alloy, copper molybdenum alloy, copper tungsten carbide alloy, silver copper alloy, silver copper nickel alloy or fine silver. In the practice of this invention, the copper alloy carrier object and the alloy contact object are placed into direct contact such that there is defined an exposed position or junction where said carrier object and said contact object come into direct contact. Thereupon, there is placed at said position or junction a quantity of brazing alloy, such as a brazing alloy analyzing at about 56% by weight silver, about 22% by weight copper, about 17% by weight zinc and about 5% by weight tin or a brazing alloy having the composition of about 65% by weight silver, about 20% by weight copper and about 15% by weight zinc. The resulting assembly of the copper alloy carrier object, the alloy contact object and the brazing alloy is then subjected to furnace brazing or heating at a suitably elevated temperature, such as at a temperature in the range from about 1200° to about 1600°F., for a period of time in a non-reactive gaseous atmosphere to cause the brazing alloy to melt and to join and braze together the carrier object and the contact object.

The non-reactive gaseous atmosphere employed in the furnace brazing operation is non-reactive under the conditions of brazing so as not to oxidize or reduce or to otherwise substantially adversely affect the objects being brazed or the brazing alloy or the resulting finished product. In most cases, a suitable gaseous atmosphere for the furnace brazing operation is provided by an atmosphere consisting essentially of hydrogen. In some instances, however, where one of the objects being brazed is susceptible to being reduced, such as is the case where one of the objects is made up of silver cadmium oxide alloy wherein the cadmium oxide making up the silver cadmium oxide alloy would tend to be reduced upon prolonged exposure at an elevated temperature to a gaseous atmosphere containing a substantial amount of hydrogen, it is preferred to employ a substantially inert atmosphere, such as an atmosphere comprising substantially only nitrogen or other suitable non-reactive gases, such as helium or argon or mixtures thereof. Such non-reactive atmospheres might also suitably contain a minor amount of hydrogen, less then about 20% by volume hydrogen, such as the amount of hydrogen in the range 5–10% by volume, the remainder being an inert gas such as nitrogen.

The temperature employed during the furnace brazing operation is conveniently suitably elevated sufficient to melt the brazing alloy and, of course, not to melt the objects to be brazed or joined. The brazing temperature employed should be at least greater than the solidus of the brazing alloy employed in the brazing operation. As indicated hereinabove, the brazing temperature may be in the range 1200°–1600°F. and satisfactory results have been obtained at temperatures in the range 1350°–1450°F. as determined by actually measuring the temperature of the part. The temperature in the furnace may be significantly higher (100°–300°F.) depending upon the actual furnace operating conditions. A higher brazing temperature for a brazing alloy having a given melting point would tend to speed up the furnace brazing operation.

The time the assembly of the alloy carrier object and the alloy contact object and the brazing alloy is maintained in the brazing furnace exposed to the aforesaid elevated temperatures is desirably a minimum for reasons of productivity. The period of time the objects to be brazed are subjected to the furnace brazing operation, as indicated hereinabove, depends upon the furnace brazing temperature. Satisfactory results have been obtained in a short time of about a few minutes, such as about 2 minutes, and upwards of about 30 minutes, such as a time in the range 2–20 minutes, e.g., 6–14 minutes.

Reference is now made to the drawings, particularly FIG. 1 thereof.

In FIG. 1, which is exemplary of the practices of this invention, an alloy carrier member or piece 10 is provided with holes 10a. Carrier member or piece 10 is shown positioned above contact member or piece 11. Positioned above carrier member or piece 10 are pellets 12 of brazing alloy material. Pellets 12 are of a size suitable for insertion within holes 10a of carrier piece 10.

In the practice of this invention illustrated in FIG. 1, carrier piece 10 is placed on contact pieces 11 into direct contact therewith and for support thereon. Thereupon, pellets 12 of the brazing alloy are inserted within holes 10a of carrier piece 10. The resulting assembly is then subjected to a furnace operation in accordance with the invention as described hereinabove to produce the resulting brazed product made up of carrier member 10 brazed and fixed to contact pads 11. The resulting brazed product is shown in partial cross-section in FIG. 2.

Figure 2:
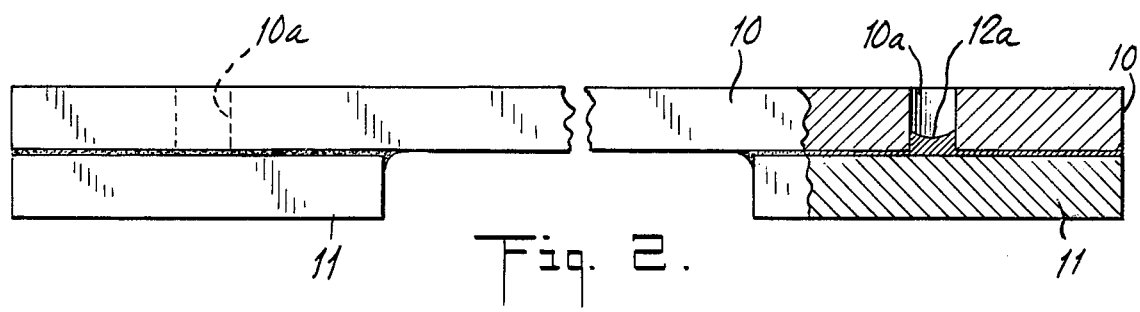
FIG. 2 shows in partial cross-section the resulting finished, brazed object.

In FIG. 2, the brazing alloy material 12a is shown in solidified form after pellet 12 has been melted during the furnace brazing operation. Brazing alloy material 12a partially fills holes 10a of carrier member 10, as illustrated, and occupies the available interstitial or interfacial space between carrier member 10 and contact members 11.

Figure 3:
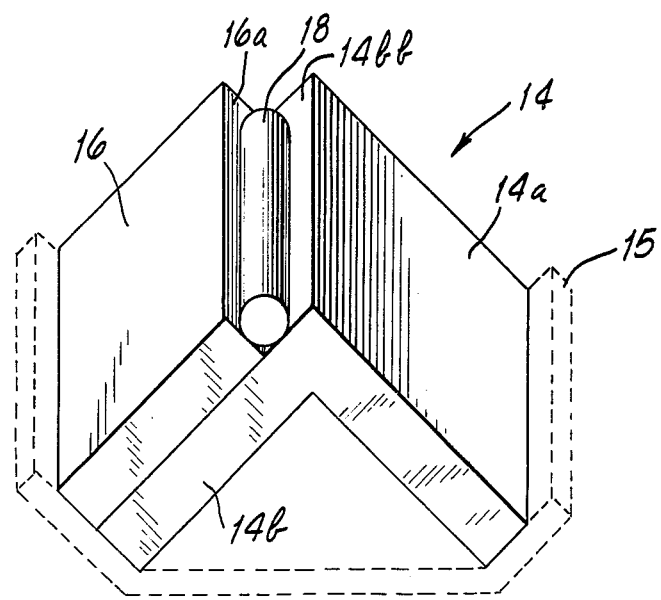
FIG. 3 illustrates in perspective an assembly of metal objects to be brazed in accordance with the practices of this invention.

FIG. 3 shows another embodiment of the practices of this invention. As illustrated in FIG. 3, angle carrier member or piece, generally indicated by reference 14, made up of legs or portions 14a and 14b, is positioned and fitted into jig or holder 15 indicated in dashed outline. Contact member or piece 16 is shown positioned at an angle on top of portion or piece 14b of carrier member 14, contact piece 16 being supported relative to portion 14b of carrier member 14 by jig or holder 15, as illustrated, so that contact piece 16 is in direct contact with surface 14bb of portion 14b. Piece 18, such as an assembly of pellets or a length of wire made up of brazing alloy material, as illustrated, is positioned in the crevice or angle defined by the juncture of side face 16a of contact piece 16 and the exposed or uncovered portion of surface 14bb of carrier member 14 not in contact with contact piece 16.

In accordance with the practices of this invention, the assembly illustrated in FIG. 3 is subjected to a furnace brazing operation to melt brazing alloy piece 18 such that the resulting molten alloy would seep into and flow into the interstitial or interfacial space between contact member 16 and covered surface of portion 14b of carrier member 14. Depending upon the amount of brazing alloy desired to be employed to effect the brazed joint, the size of the pellets or amount of wire form 18 of brazing alloy material is adjusted.

The practices of this invention are particularly applicable to the brazing of copper alloys to silver alloys or copper alloys. For example, the practices of this invention are especially applicable to the brazing of a carrier piece or member made up of a copper alloy, such as O.F.H.C., D.L.P.-D.H.P. copper alloys. Heat treatable copper base alloys containing additions of Fe, Cr, Cd, Si and/or Ni are also usefully employed in the practices of this invention as well as most of the brasses and bronzes, save aluminum bronze. Composite materials made up of copper-clad steels and the like are also usefully employed. With respect to the copper-containing composite materials, the brazing would be directed to effecting a bond between the copper-containing surface of the composite material to another surface.

With respect to the other alloy contact member to be brazed or bonded to the aforementioned carrier member, contact members made up of silver or copper alloys are particularly useful. Contact alloy members made up of silver cadmium oxide alloys or fine silver-backed silver cadmium oxide alloys, the silver cadmium oxide alloy or component containing cadmium oxide in the range 5–15% by weight with a fine silver backing thickness range from about 10–20% of the total thickness, are particularly useful.

Other alloys for the make-up of the alloy contact materials and which are suitably brazed in accordance with the practices of this invention include the silver tungsten alloys (AG-W), the silver tungsten carbide alloys (Ag-WC), the silver nickel alloys (Ag-Ni), the silver iron alloys (Ag-Fe), the silver carbon alloys (Ag-C), the silver molybdenum alloys (Ag-Mo), the copper tungsten alloys (Cu-W), the copper molybdenum alloys (Cu-Mo), the copper tungsten carbide alloys (Cu-WC), as well as the silver copper alloys (Ag-Cu), the silver copper nickel alloys (Ag-CU-Ni) and fine silver and fine silver alloys.

The cadmium oxide-containing silver alloys require that the furnace brazing operation be carried out in a non-reactive, slightly-reducing atmosphere to avoid substantial reduction of the cadmium oxide present in the silver cadmium oxide alloy. Accordingly, a suitable substantial slightly-reducing atmosphere for use in the furnace brazing of a silver cadmium oxide alloy contact material or piece would comprise about 5% by volume hydrogen, the remainder being nitrogen. The other aforementioned alloys could be brazed in a reducing atmosphere, such as an atmosphere comprising substantially only about 100% hydrogen. In the brazing operations, however, a non-oxidative atmosphere is to be employed, that is, the brazing operation should not be carried out under conditions such that oxidation of the metal objects occur, including oxidation of the brazing alloy itself.

With respect to the brazing alloy, any suitable brazing alloy may be employed. Particularly satisfactory results have been obtained employed a brazing alloy analyzing about 56% by weight silver, 22% by weight copper, 17% by weight zinc and 5% by weight tin. Other brazing alloys, such as an Ag-Cu-Zn alloy analyzing about 65% by weight silver, about 20% by weight copper and about 15% by weight zinc, have been found to yield satisfactory results.

In the actual furnace brazing operation, the assembly of objects to be brazed could be placed on a belt and passed through a furnace effecting furnace brazing therein, depending upon the furnace temperature employed and belt speeds which gave residence times in the furnace for the objects being brazed ranging from about 2 minutes to about 14 minutes, have been found to give satisfactory results.

An additional feature of the practices of this invention includes plating or coating the brazing alloy with silver or copper, preferably silver, prior to assembling the objects and the brazing alloy together for brazing. Plating or coating of the brazing alloy with silver or copper is desirable, sometimes necessary, to prevent the brazing alloy from becoming discolored during the period the alloy is heated to brazing temperature. Further, plating or coating the brazing alloy results in improved brazed fillets and a more uniform brazed joint.

By employing the practices of this invention, the porosity of the brazed joint, particularly as compared with a brazed joint produced by conventional techniques, is signficantly reduced. Further, the percent area of bond is greater in brazed joints made in accordance with the practices of this invention than by conventional practices. Also, the brazed joint fillets offer visual indications and confirmation of braze alloy flow across the joint and evidence of a sound brazed joint. Since in the practices of the invention the brazing alloy is required to flow through the brazed joint to be made, if fillets are observed at the edges of the members being joined, such as at the contact member tip, such would be an indication that the brazed alloy flowed through the joint and accordingly provides a visual method for checking the quality of the brazed joint. Additionally, by following the practices of this invention which does not require the use of a flux, the brazed joint quality is improved because of the elimination of flux. The use of flux is eliminated since the furnace atmosphere surrounding the members being brazed does not oxidize the members.

The following example is illustrative of the practices of this invention.

A 1 × 4 × ¼ inch O.F.H.C. copper bar having two ¼ inch holes drilled therethrough at each end is placed on top of two 1 × 1 × ⅜ inch silver cadmium oxide pads containing 10% by weight cadmium oxide. Into each of the holes drilled through the copper bar is inserted a pellet of brazing alloy, Engelhard Industries 3558, analyzing about 56% by weight silver, 22% by weight copper, 17% by weight zinc and 5% by weight tin. An assembly of the pellets, bar and contact pads is illustrated in FIG. 1. The resulting assembly is then passed on a moving belt through a brazing furnace having an atmosphere therein of the composition 95% by volume $N_2$ and 5% by volume $H_2$ at a temperature in the range 1580°–1620°F. The passage of the assembly through the brazing furnace requires not more than about 10 minutes, sufficient to melt the brazing alloy pellet and to braze and bond together the copper bar and silver cadmium oxide contact pads, as illustrated in FIG. 2.

As will be apparent to those skilled in the art in the light of the foregoing disclosure, many modifications, alterations and substitutions are possible in the practices of this invention without departing from the spirit or scope thereof.

I claim:

1. A method of joining by brazing a copper alloy carrier object and an alloy contact object, said alloy of said contact object being a silver cadmium oxide alloy having a cadmium oxide content in the range from about 5% to about 15% by weight, which comprises placing said copper alloy carrier object and said alloy contact object into direct contact such that there is defined an exposed position of junction where said carrier object and said contact object come into direct contact, placing at said position or junction a quantity of brazing alloy, said brazing alloy being slected from the brazing alloys having the composition about 56% by weight silver, about 22% by weight copper, about 17% by weight zinc and about 5% by weight tin or about 65% by weight silver, 20% by weight copper and 15% by weight zinc, maintaining said brazing alloy at said position or junction relative to said carrier object and said contact object while subjecting the resulting assembly to furnace brazing at a temperature in the range from about 1200° to about 1600°F. for a period of time in a non-reactive gaseous atmosphere to cause said quantity of brazing alloy to melt and to join and braze together said carrier object and said contact object.

2. A method in accordance with claim 1 wherein said atmosphere is made up of a minor amount, less than 20%, by volume hydrogen, the remainder being an inert gas.

3. A method in accordance with claim 1 wherein said atmosphere comprises about 5–10% by volume $H_2$, the remainder being $N_2$.

4. A method in accordance with claim 1 wherein said temperature is in a range 1350°–1450°F.

5. A method in accordance with claim 1 wherein said period of time is in a range from about 2 minutes to about 30 minutes.

6. A method in accordance with claim 1 wherein the copper alloy of said copper alloy carrier object is a heat treatable copper base alloy.

7. A method in accordance with claim 6 wherein said heat treatable copper base alloy contains minor additive amounts of Fe, Cr, Cd, Si and/or Ni.

8. A method in accordance with claim 1 wherein said copper alloy of said copper alloy carrier object is a O.F.H.C., D.L.P. or D.H.P. copper alloy.

9. A method in accordance with claim 1 wherein the copper alloy of said copper alloy carrier object is brass.

10. A method in accordance with claim 1 wherein the copper alloy of said copper alloy carrier object is bronze.

11. A method in accordance with claim 1 wherein said copper alloy carrier object comprises copper-clad steel.

12. A method in accordance with claim 1 wherein said non-reactive atmosphere consists essentially of about 5% by volume hydrogen and about 95% by volume nitrogen.

13. A method in accordance with claim 1 wherein said silver cadmium oxide alloy is a fine silver-backed silver cadmium oxide alloy, the backing thickness of said fine silver comprising from about 10 to about 20% of the total thickness of said contact object.

14. A method in accordance with claim 1 wherein said brazing alloy is a silver-plated brazing alloy.

15. A method in accordance with claim 1 wherein said brazing alloy is a copper-plated brazing alloy.

* * * * *